United States Patent
Gomez et al.

(10) Patent No.: US 12,432,822 B2
(45) Date of Patent: Sep. 30, 2025

(54) COOKTOP APPLIANCE AND DUAL WIRE SENSOR ASSEMBLY

(71) Applicant: Haier US Appliance Solutions, Inc., Wilmington, DE (US)

(72) Inventors: Eugenio Gomez, Louisville, KY (US); Steven Michael Recio, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 855 days.

(21) Appl. No.: 17/708,579

(22) Filed: Mar. 30, 2022

(65) Prior Publication Data

US 2023/0319955 A1 Oct. 5, 2023

(51) Int. Cl.
  *H05B 3/74* (2006.01)
  *G01K 1/14* (2021.01)

(52) U.S. Cl.
  CPC ............... *H05B 3/74* (2013.01); *G01K 1/14* (2013.01); *H05B 2213/05* (2013.01)

(58) Field of Classification Search
  CPC .. H05B 3/74; H05B 2213/05; H05B 2213/07; G01K 1/14; G01K 1/146
  See application file for complete search history.

(56) References Cited

U.S. PATENT DOCUMENTS

| | | | |
|---|---|---|---|
| 9,074,765 B2 | 7/2015 | Armanni | |
| 10,215,405 B2 | 2/2019 | Kim et al. | |
| 2006/0215731 A1* | 9/2006 | Gadonniex | G01K 1/16 374/185 |
| 2012/0152230 A1* | 6/2012 | Armanni | F23D 14/06 431/284 |
| 2017/0142780 A1* | 5/2017 | Hoare | H05B 6/1263 |
| 2019/0357319 A1* | 11/2019 | Bassill | H05B 6/062 |
| 2021/0010677 A1* | 1/2021 | Johnson | F24C 3/126 |
| 2021/0239538 A1* | 8/2021 | Cadima | F23D 14/72 |

FOREIGN PATENT DOCUMENTS

| | | | |
|---|---|---|---|
| JP | 3776385 B2 | 5/2006 | |
| JP | 5138791 B2 | 2/2013 | |

* cited by examiner

Primary Examiner — John P. Dulka
(74) Attorney, Agent, or Firm — Dority & Manning, P.A.

(57) ABSTRACT

A cooktop appliance including a sensor assembly including a body, a centerbody, a sensor, a first wire, and a second wire is provided. The body forms a plenum, a first wire path, a second wire path, and a sensor cavity. The body forms the first wire path and the second wire path each extending from the plenum from a first end to the sensor cavity at a second end distal to the first end. The centerbody forms a fluid path extending in fluid communication from the plenum to each of the first wire path and the second wire path. The body forms a top wall separating the sensor cavity from the fluid path. The sensor is positioned at the sensor cavity. The first wire extends through the first wire path and the second wire extends through the second wire path. The first and second wires operably couple to the sensor.

20 Claims, 13 Drawing Sheets

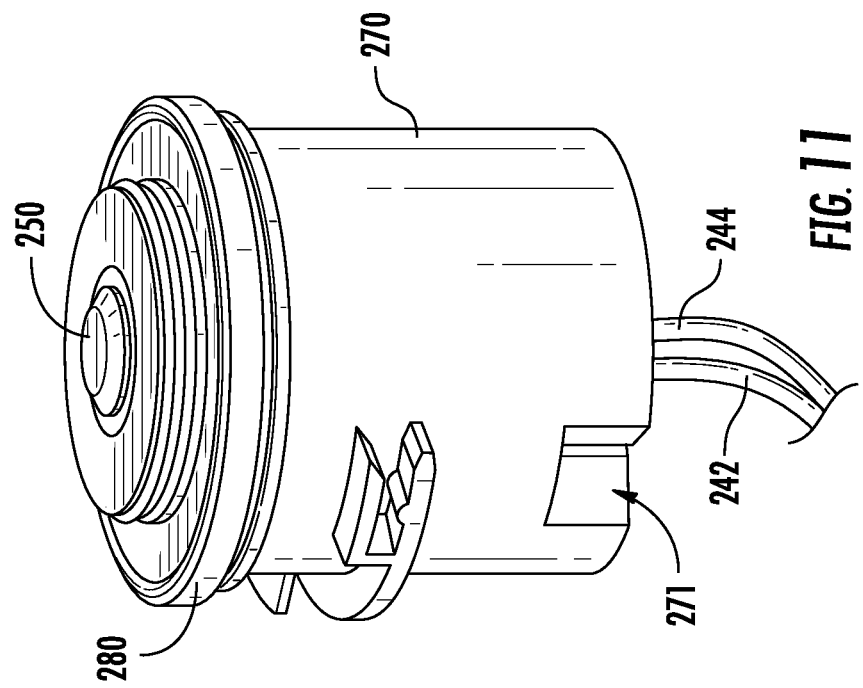
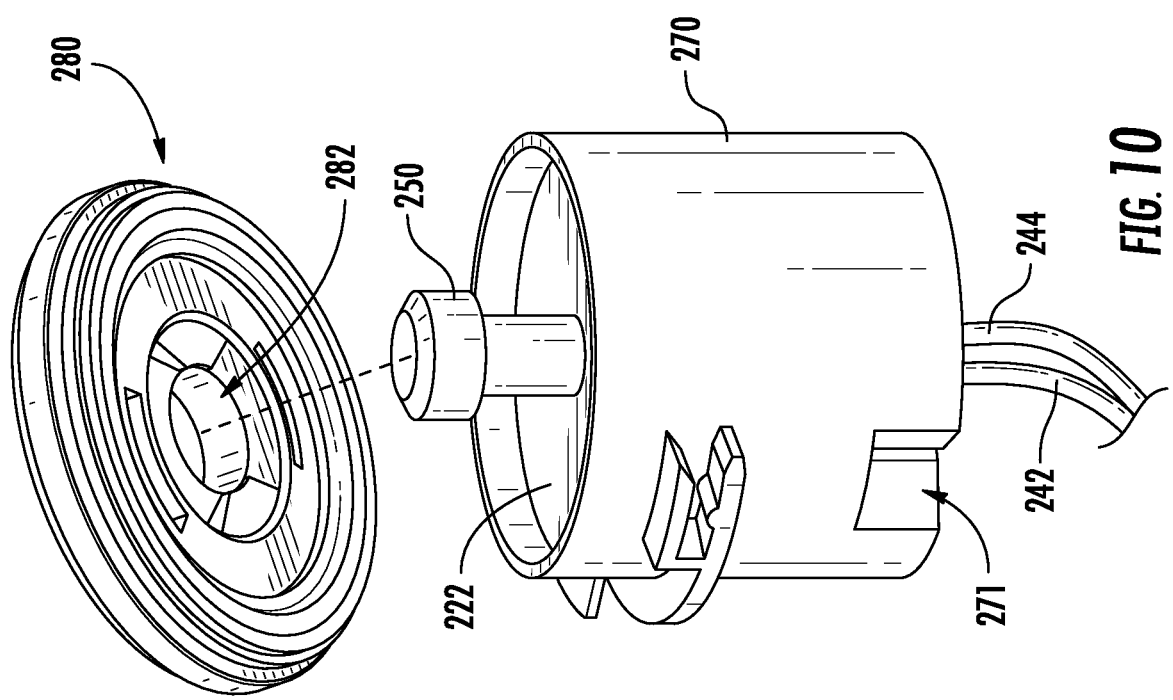

COOKTOP APPLIANCE AND DUAL WIRE SENSOR ASSEMBLY

FIELD OF THE INVENTION

The present subject matter relates generally to cooktop appliances, and more particularly to temperature sensors for cooktop appliances.

BACKGROUND OF THE INVENTION

Certain cooktop appliances include electric heating elements for heating pots, pans, and other containers with food items therein. The electric heating elements can be operated at various settings. For example, the electric heating elements can be operated at a low heat setting to simmer food items, or the electric heating elements can be operated at a high heat setting to boil water or fry food items.

Cooktop appliances often include temperature sensors that provide feedback for setting a temperature at the cooktop appliance, such as at a heating element. Such temperature sensors are often assemblies of several components. For instance, temperature sensor assemblies may include an adhesive sealant, such as room-temperature vulcanized silicone (RTV), to join two or more components and seal gaps between such components.

However, such structures and methods for construction are vulnerable to gaps or inconsistencies at the RTV, or between the components, which may allow for fluids to leak into the temperature sensor. Controlling for such structural and manufacturing errors is time-consuming and may require inspection of every temperature sensor during manufacturing. When fluids, such as liquids from spilled food, enter the temperature sensor, the liquid may cause the sensing portion of the temperature sensor assembly to fail. Such failures may cause the heating element to no longer operate, or produce incorrect feedback and resulting cooking temperatures.

Accordingly, a cooktop appliance with an improved temperature sensor would be useful. Furthermore, a temperature sensor that addresses one or more of these issues would be useful.

BRIEF DESCRIPTION OF THE INVENTION

An aspect of the present disclosure is directed to a temperature sensor assembly. The temperature sensor assembly includes a body, a centerbody, a sensor, a first wire, and a second wire. The body forms a plenum, a first wire path, a second wire path, and a sensor cavity. The body forms the first wire path and the second wire path each extending from the plenum from a first end to the sensor cavity at a second end distal to the first end. The centerbody forms a fluid path extending in fluid communication from the plenum to each of the first wire path and the second wire path. The body forms a top wall separating the sensor cavity from the fluid path. The sensor is positioned at the sensor cavity. The first wire extends through the first wire path and the second wire extends through the second wire path. The first and second wires operably couple to the sensor.

Another aspect of the present disclosure is directed to a cooktop appliance. The cooktop appliance includes a ceramic plate, a heating element positioned below the ceramic plate, and a temperature sensor assembly positioned above the heating element and below the ceramic plate. The temperature sensor assembly includes a body, a centerbody, a sensor, a first wire, and a second wire. The body forms a plenum, a first wire path, a second wire path, and a sensor cavity. The body forms the first wire path and the second wire path each extending from the plenum from a first end to the sensor cavity at a second end distal to the first end. The centerbody forms a fluid path extending in fluid communication from the plenum to each of the first wire path and the second wire path. The body forms a top wall separating the sensor cavity from the fluid path. The sensor is positioned at the sensor cavity. The first wire extends through the first wire path and the second wire extends through the second wire path. The first and second wires operably couple to the sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 10 provides a perspective view of an exemplary embodiment of the temperature sensor assembly in accordance with an exemplary embodiment of the present subject matter.

FIG. 11 provides a perspective view of an exemplary embodiment of the temperature sensor assembly of FIG. 10 in accordance with an exemplary embodiment of the present subject matter.

DETAILED DESCRIPTION

Figure 1A:
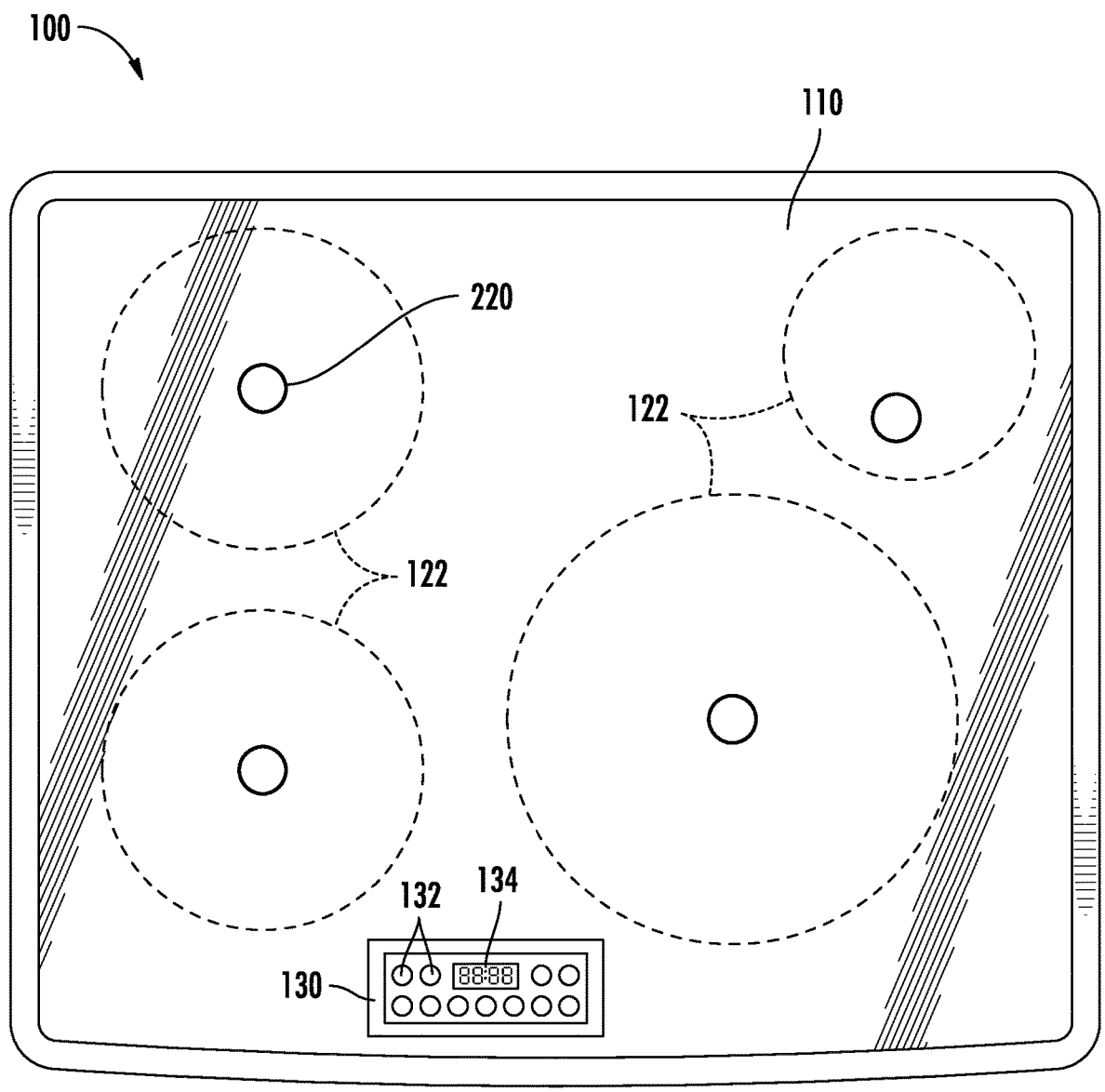
FIG. 1A provides a top, plan view of a cooktop appliance in accordance with an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1B:
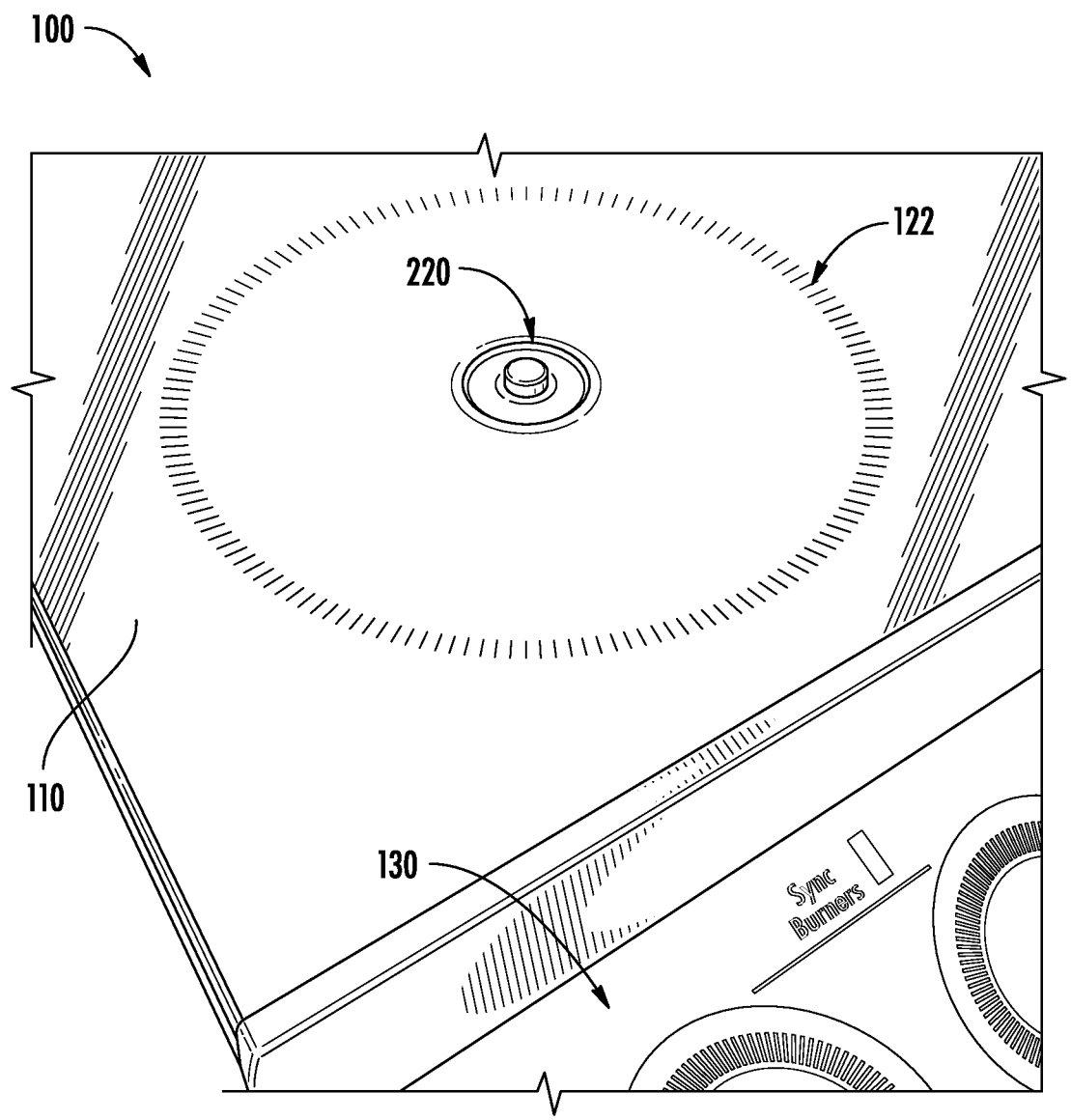
FIG. 1B provides a perspective view of a portion of a cooktop appliance in accordance with an exemplary embodiment of the present subject matter.

FIG. 1A provides a top, plan view of a cooktop appliance 100 according to an exemplary embodiment of the present subject matter. FIG. 1B provides a perspective view of a portion of an exemplary embodiment of a cooktop appliance 100. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops.

Figure 3:
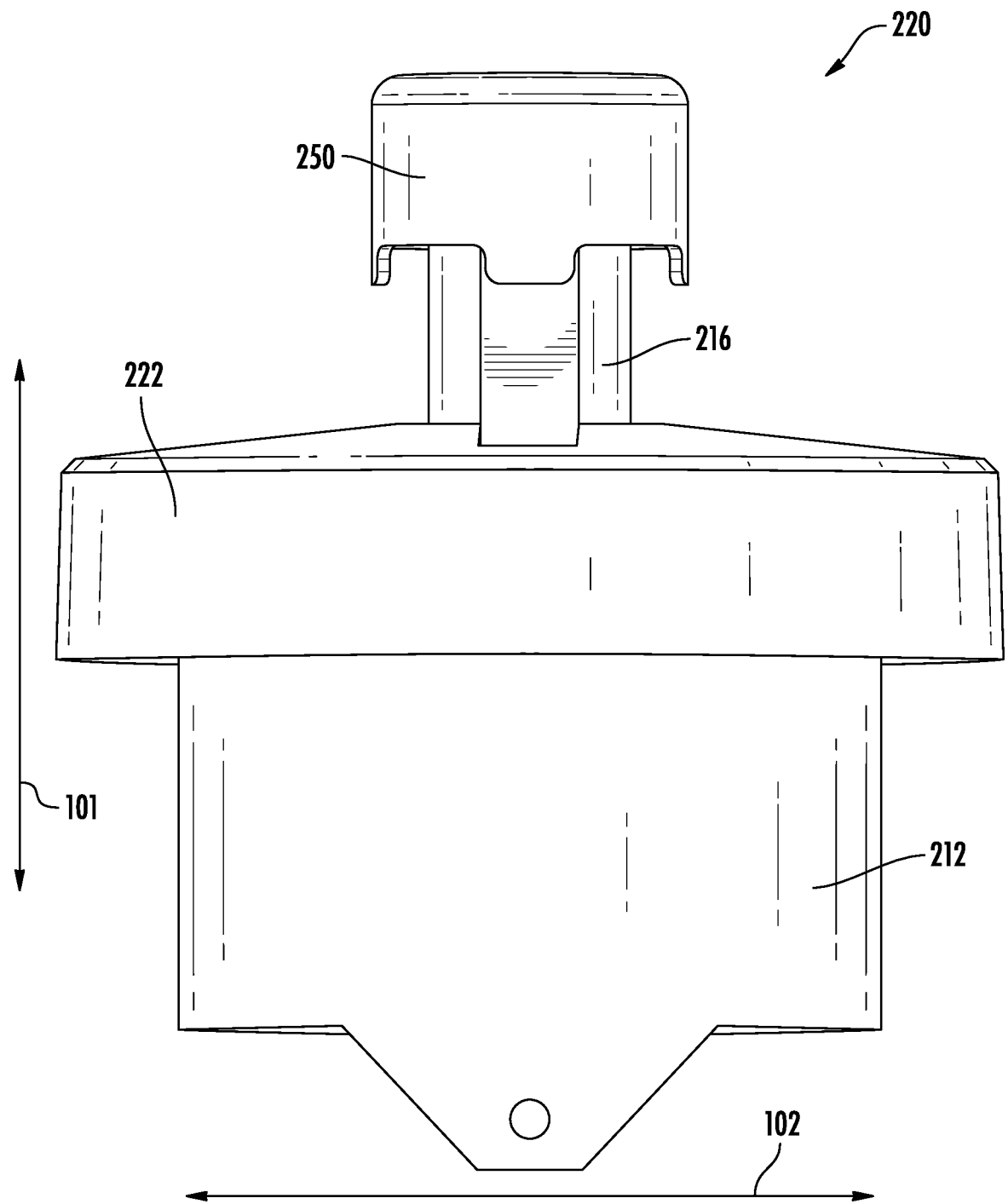
FIG. 3 provides a side view of a temperature sensor assembly for the cooktop appliance of FIG. 1 in accordance with an exemplary embodiment of the present subject matter.

Cooktop appliance 100 includes a ceramic plate 110 for supporting cooking utensils, such as pots or pans, on a cooking or top surface 114 of ceramic plate 110. Ceramic plate 110 may be any suitable ceramic or glass plate. Heating assemblies 122 are mounted below ceramic plate 110 such that heating assemblies 122 are positioned below ceramic plate 110, e.g., along a vertical direction V (FIG. 3). Ceramic plate 110 may be continuous over heating assemblies 122. In certain exemplary embodiments, a sensor assembly 220 may protrude through an opening at the ceramic plate 110. FIG. 1B depicts the sensor assembly 220 protruding through ceramic plate 110. In a particular embodiment, sensor assembly 220 is positioned through a center of a heating assembly 122. However, it should be appreciated that in other embodiments, sensor assembly 220 may be offset from the center, such as positioned along a radius from the center. In various embodiments, such as described further herein, sensor assembly 220, or portions thereof, is configured to actuate into and out of ceramic plate 110.

While shown with four heating assemblies 122 in the exemplary embodiment of FIG. 1, cooktop appliance 100 may include any number of heating assemblies 122 in alternative exemplary embodiments. Heating assemblies 122 can also have various diameters or areas. For example, each heating assembly 122 can have a different diameter, the same diameter, or any suitable combination thereof, or other surface areas. Heating assembly 122 may particularly be configured as induction heating assemblies. However, cooktop appliance 100 is provided by way of example only and is not limited to the exemplary embodiment shown in FIG. 1A. For example, a cooktop appliance having one or more heating assemblies in combination with one or more electric radiant or resistance heating elements, or one or more gas burner heating elements, can be provided. In addition, various combinations of number of heating assemblies, position of heating assemblies and/or size of heating assemblies can be provided. It will also be understood that the present subject matter is suitable for use with other electric heating elements, such as induction heating elements.

A user interface 130 provides visual information to a user and allows a user to select various options for the operation of cooktop appliance 100. For example, displayed options can include a desired heating assembly 122, a desired cooking temperature, and/or other options. User interface 130 can be any type of input device and can have any configuration. In FIG. 1, user interface 130 is located within a portion of ceramic plate 110. Alternatively, user interface 130 can be positioned on a vertical surface near a front side of cooktop appliance 100 or anywhere convenient for a user to access during operation of cooktop appliance 100.

In the exemplary embodiment shown in FIG. 1, user interface 130 includes a capacitive touch screen input device component 132. Capacitive touch screen input device component 132 can allow for the selective activation, adjustment or control of any or all heating assemblies 122 as well as any timer features or other user adjustable inputs. One or more of a variety of electrical, mechanical or electro-mechanical input devices including rotary dials, push buttons, toggle/rocker switches, and/or touch pads can also be used singularly or in combination with capacitive touch screen input device component 132. User interface 130 also includes a display component 134, such as a digital or analog display device designed to provide operational feedback to a user.

Figure 2A:
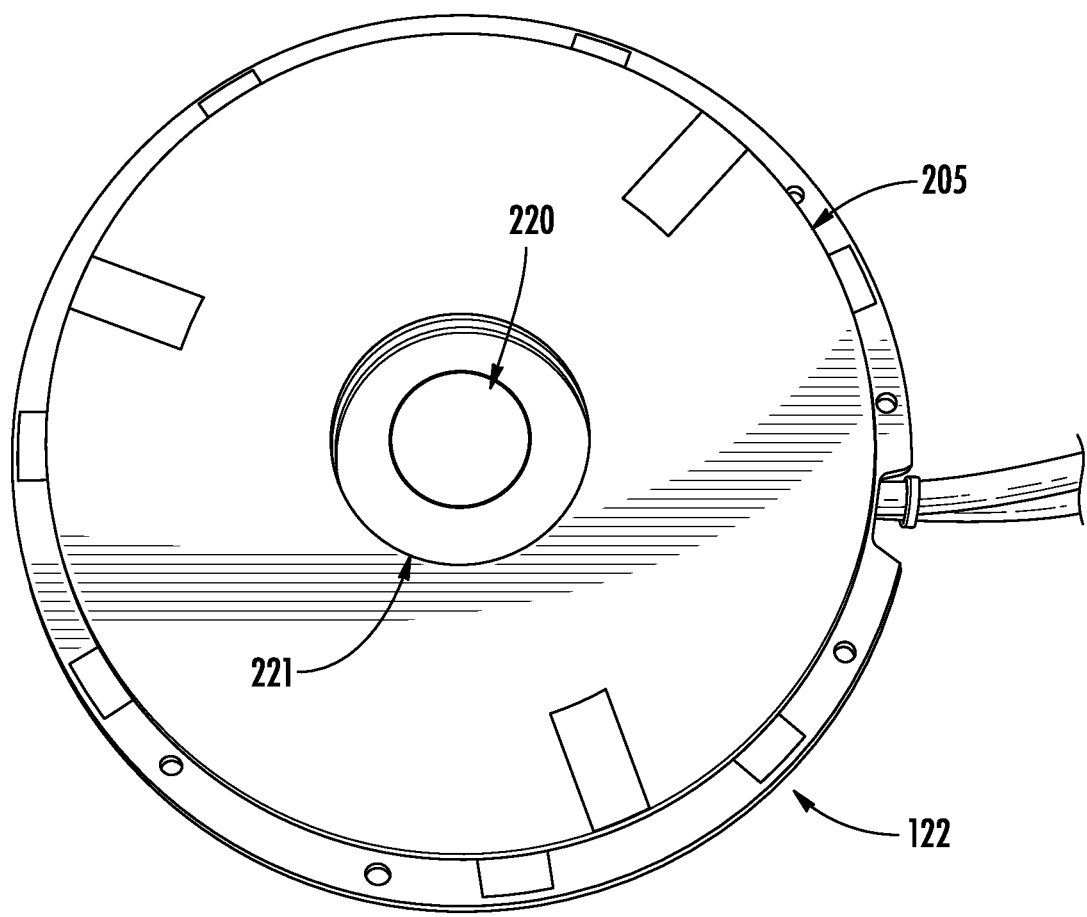
FIG. 2A provides a top, plan view of an exemplary heating assembly of the exemplary cooktop appliance of FIGS. 1A-1B.

FIG. 2A provides a top, plan view of heating assembly 122 of cooktop appliance 100 (FIG. 1A-1B). As may be seen in FIG. 2A, heating assembly 122 includes an induction heating element 205. Induction heating element 205 may be configured to generate or transfer heat through electrically conductive materials. Induction heating element 205 may be configured as an induction heating coil configured to generate or transfer heat through electrically conductive materials at cookware positioned at the ceramic plate 110 (FIG. 1A-1B) at the heating assembly 122. Opening 221 is positioned through the heating element 205 to allow sensor assembly 220 to extend through the opening 221, such as to allow the sensor assembly 220 to protrude through the ceramic plate 110 (FIG. 1B). In a particular embodiment, opening 221 is positioned through the center of heating element 205. However, it should be appreciated that in other embodiments opening 221 and sensor assembly 220 may be positioned off-center.

Figure 2B:
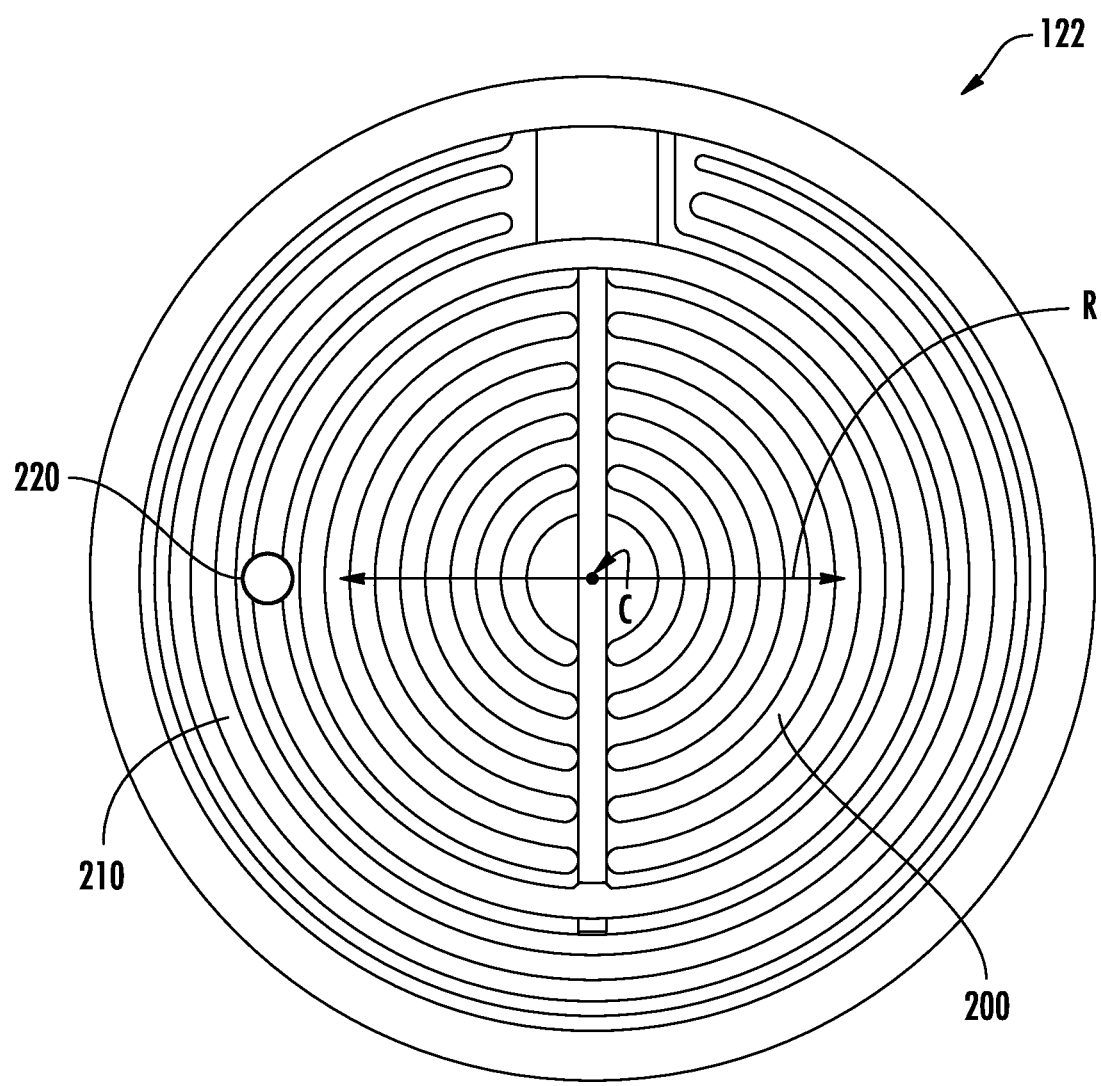
FIG. 2B provides a top, plan view of an exemplary heating assembly of the exemplary cooktop appliance of FIGS. 1A-1B.

In still certain embodiments, as may be seen in FIG. 2B, heating assembly 122 includes a first or inner heating element 200 and a second or outer heating element 210. Outer heating element 210 of heating assembly 122 is positioned concentrically relative to inner heating element 200 of heating assembly 122. In particular, inner heating element 200 of heating assembly 122 and outer heating element 210 of heating assembly 122 are spaced apart from each other, e.g., along a radial direction R, such that outer heating element 210 of heating assembly 122 extends circumferentially around at least a portion of inner heating element 200 of heating assembly 122.

It should be appreciated that other embodiments of heating assembly 122 or heating elements 200 may be utilized. For instance, various embodiments may include rectangular, polygonal, or substantially non-circular heating elements. Embodiments of heating elements may be separated into sections, quadrants, arcs, or other components or component portions. In still various embodiments, heating assembly 122 may include a single heating element, or two or more heating elements, or combinations of types of heating elements.

Cooktop appliance may include a controller (not depicted) including a memory device and a processor, e.g., a non-transitory, memory and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. User interface 130 and other components of cooktop appliance 100 may be in communication with controller via one or more signal lines, wireless communication modules, or shared communication buses.

As shown in FIG. 2, cooktop appliance 100 includes a sensor assembly 220. Sensor assembly 220 may include any suitable type of temperature sensor, such as a thermocouple, a thermistor, etc. Sensor assembly 220 is positioned proximate a bottom surface 112 of ceramic plate 110 above heating assembly 122. A signal(s) from sensor assembly 220 corresponds to a temperature of ceramic plate 110 and/or to a temperature of a cooking utensil on ceramic plate 110 above heating assembly 122.

In certain embodiments, sensor assembly 220 is positioned above heating assembly 122 such that sensor assembly 220 may be offset from a center C of heating assembly 122, e.g., along the radial direction R. Sensor assembly 220 may also be inset from an outer edge 116 of heating assembly 122, e.g., along the radial direction R. Thus, sensor assembly 220 may be positioned between center C of heating assembly 122 and outer edge 116 of heating assembly 122 along the radial direction R. Center C of heating assembly 122 may correspond to a radial center of heating assembly 122, and outer edge 116 of heating assembly 122 may correspond to an outermost portion of heating assembly 122 relative to center C along the radial direction R. As an example, sensor assembly 220 may be positioned at a junction between inner and outer heating elements 200, 210 of heating assembly 122 along the radial direction R.

Sensor assembly 220 may be offset from center C of heating assembly 122 along the radial direction R by no less than one inch and no more than eight inches, in certain exemplary embodiments. Such spacing of sensor assembly 220 from center C of heating assembly 122 may increase accuracy of sensor assembly 220 when a cooking utensil on ceramic plate 110 above heating assembly 122 has a curved, e.g., concave, bottom surface, above center C of heating assembly 122, and e.g., the cooking utensil does not contact ceramic plate 110 directly above center C of heating assembly 122.

Sensor assembly 220 may be mounted to and/or contact bottom surface 112 of ceramic plate 110. Thus, sensor assembly 220 may be positioned between ceramic plate 110 and heating assembly 122, e.g., along the vertical direction V. In alternative exemplary embodiments, sensor assembly 220 may be mounted to other components of cooktop appliance 100, such as heating assembly 122, and may be spaced from ceramic plate 110 along the vertical direction V.

Figure 4:
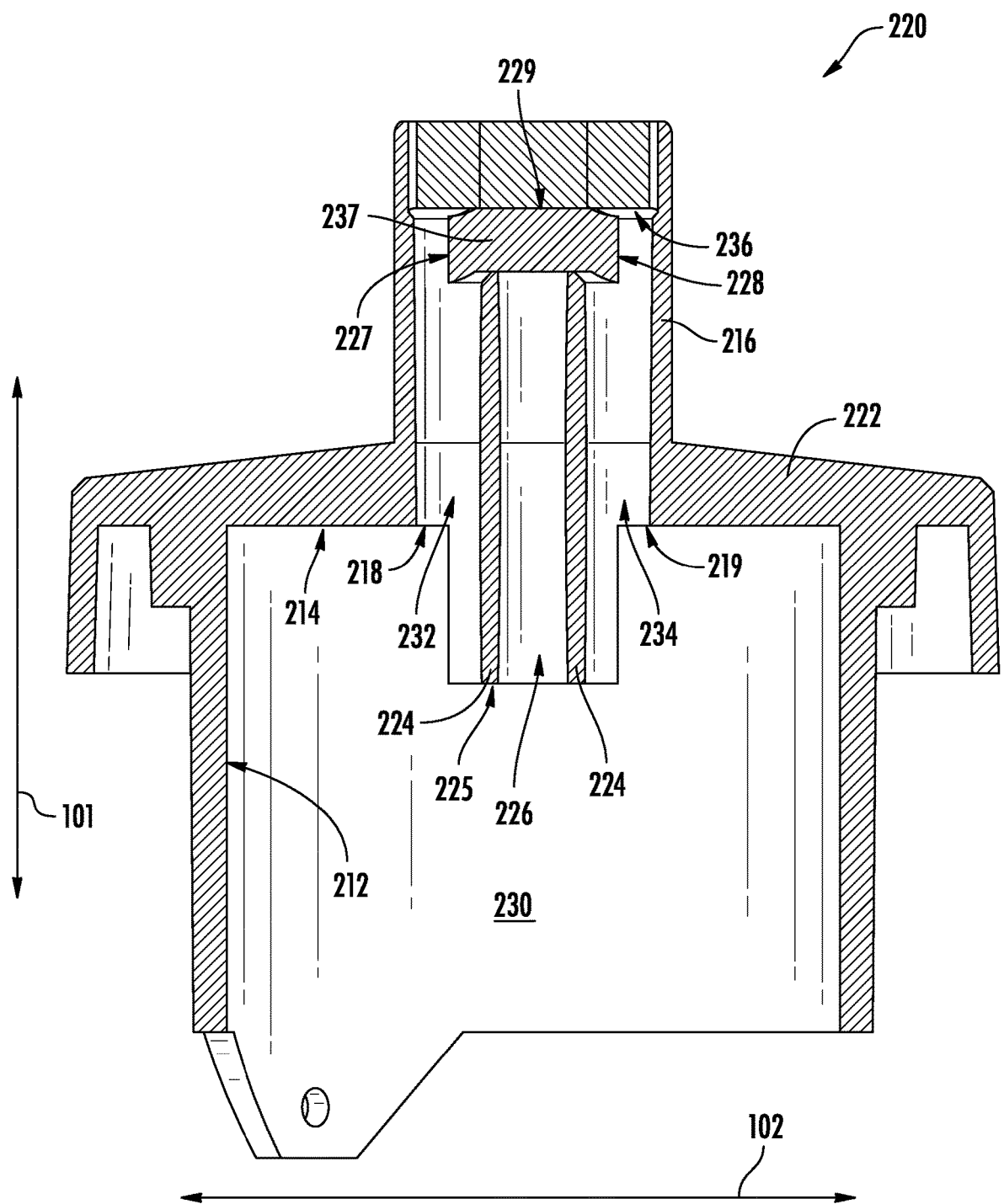
FIG. 4 provides a cutaway side view of the temperature sensor assembly of FIG. 3 in accordance with an exemplary embodiment of the present subject matter.
Figure 5A:
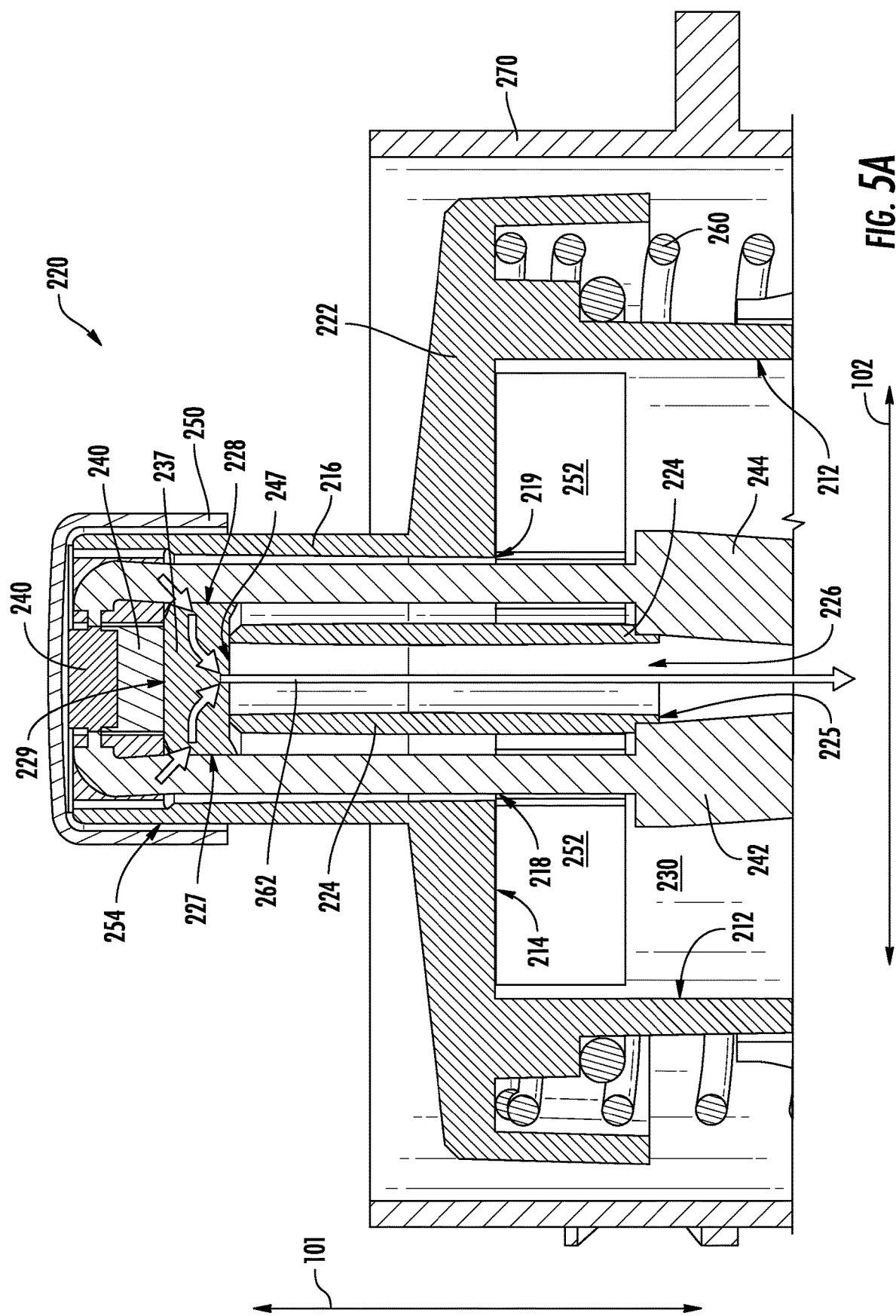
FIG. 5A provides a cutaway side view of an exemplary embodiment of the temperature sensor assembly of FIG. 3 in accordance with an exemplary embodiment of the present subject matter.
Figure 5B:
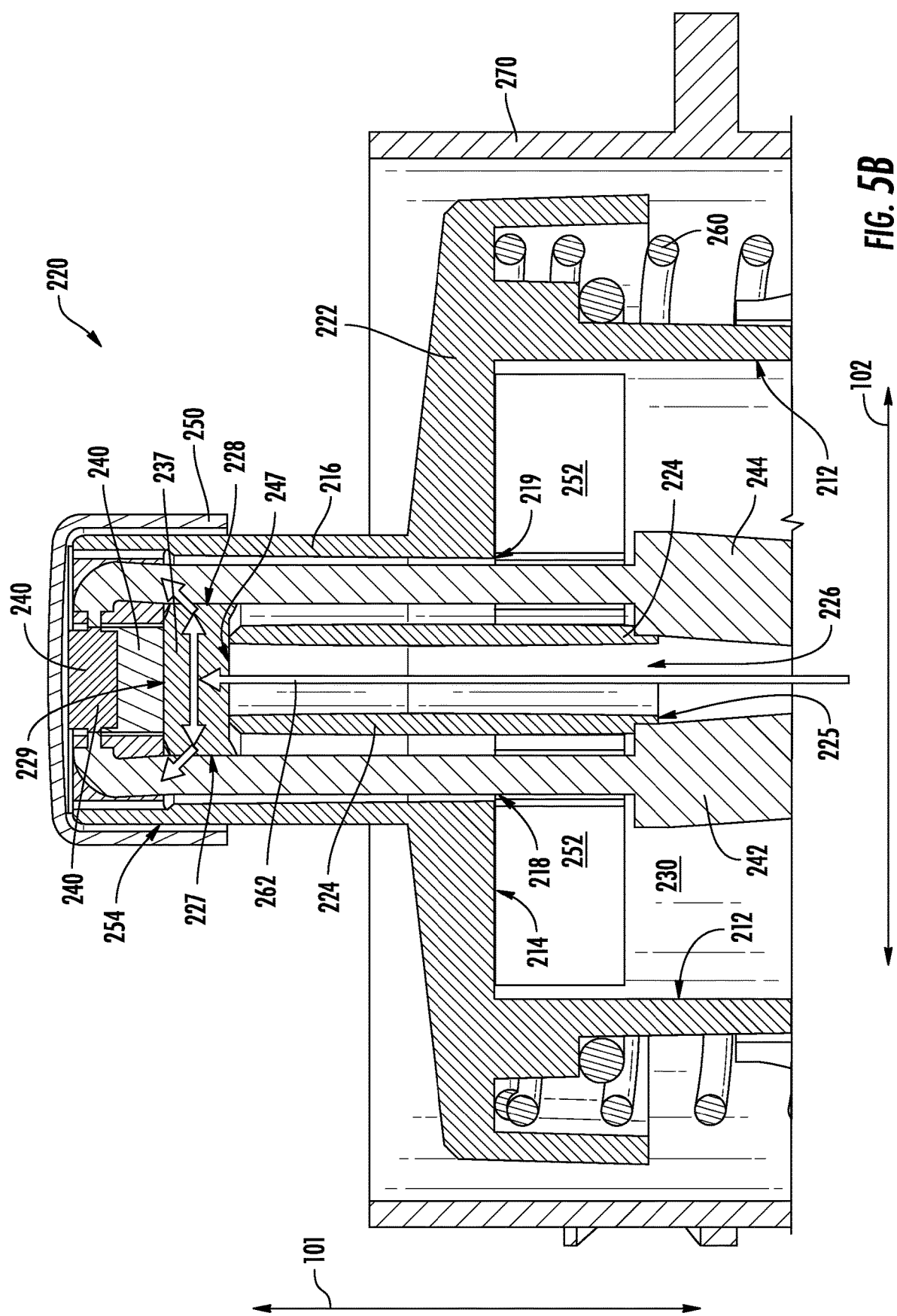
FIG. 5B provides a cutaway side view of an exemplary embodiment of the temperature sensor assembly of FIG. 3 in accordance with an exemplary embodiment of the present subject matter.
Figure 6:
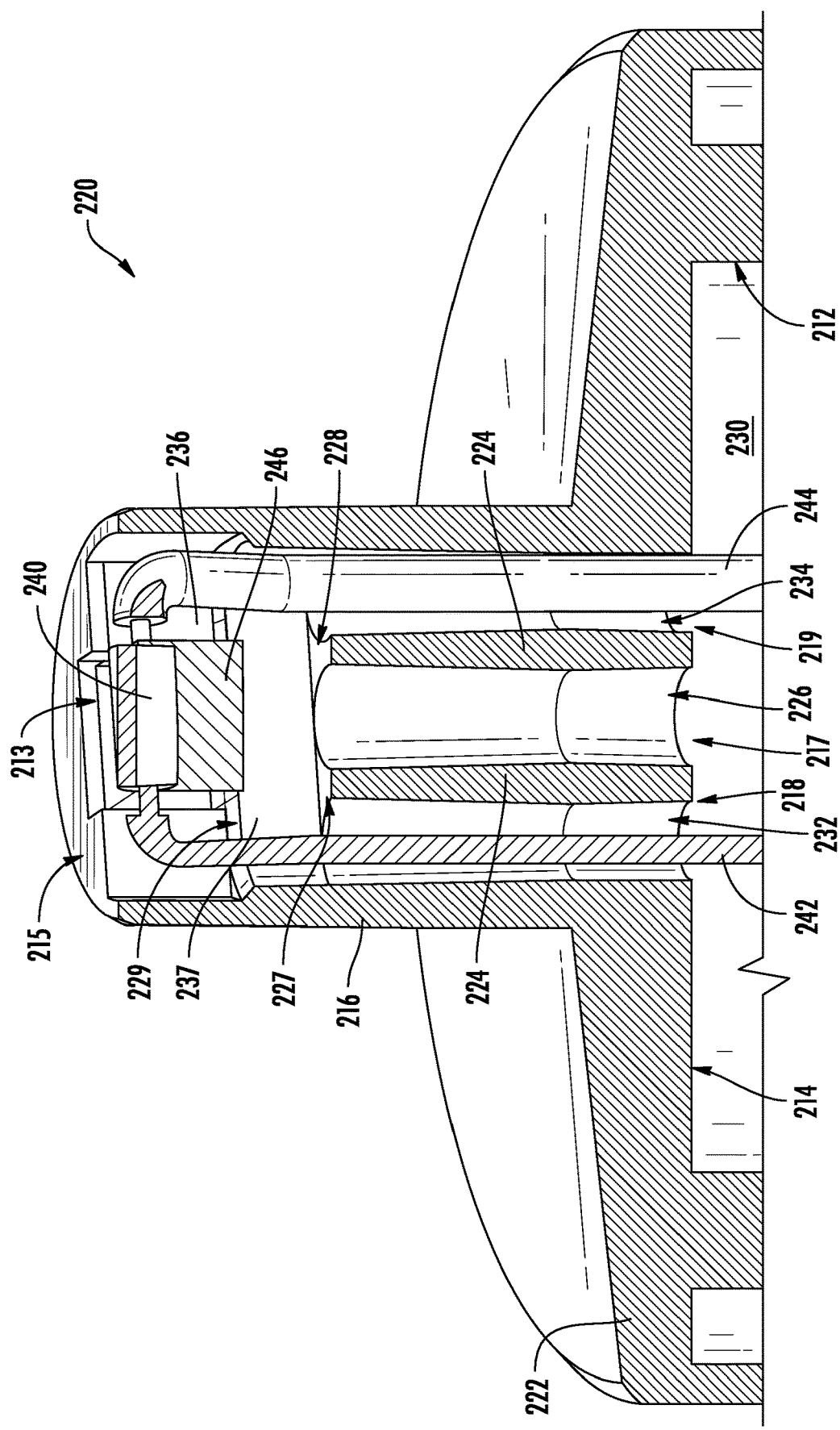
FIG. 6 provides a cutaway perspective view of an exemplary embodiment of the temperature sensor assembly of FIG. 3 in accordance with an exemplary embodiment of the present subject matter.
Figure 7:
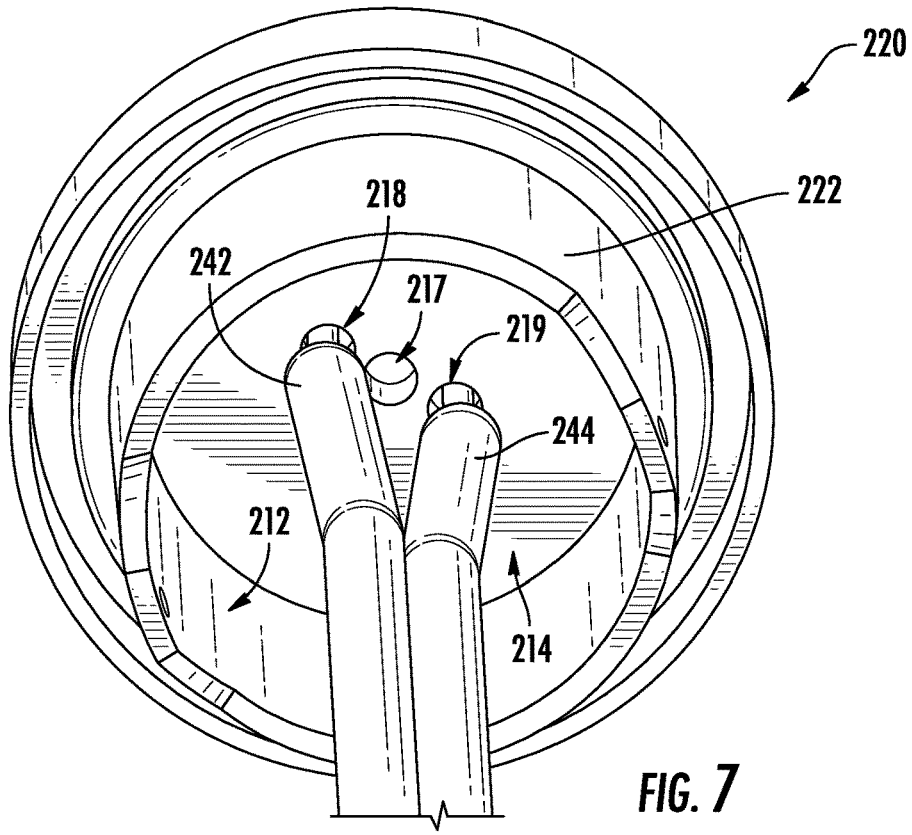
FIG. 7 provides a bottom-up perspective view of a portion of an exemplary embodiment of the temperature sensor assembly of FIG. 3 in accordance with an exemplary embodiment of the present subject matter.
Figure 8:
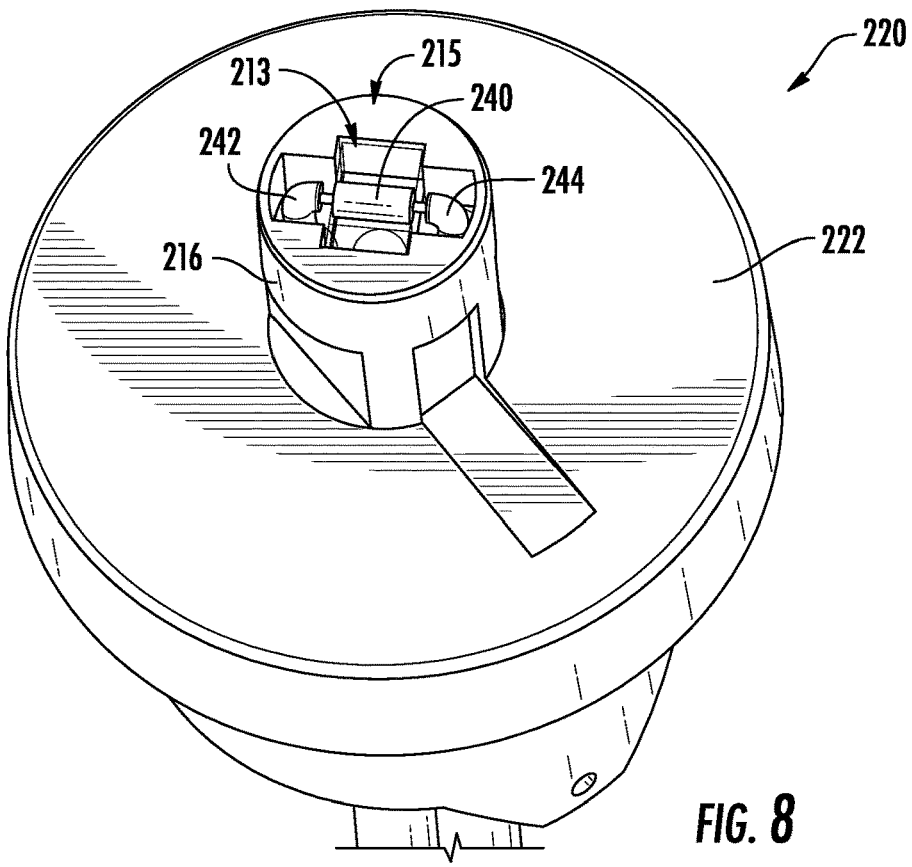
FIG. 8 provides a top-down perspective view of a portion of an exemplary embodiment of the temperature sensor assembly of FIG. 3 in accordance with an exemplary embodiment of the present subject matter.

Referring now to FIGS. 3-8, views of an exemplary embodiment of the sensor assembly 220 are provided. FIG. 3 provides a side view of an embodiment of the sensor assembly 220. FIG. 4 provides a cutaway side view of an embodiment of the sensor assembly 220 omitting certain components for clarity. FIG. 5 provides a cutaway side view of the sensor assembly 220 of FIG. 4 revealing certain components omitted in FIG. 4. FIG. 6 provides a cutaway perspective view of an embodiment of the sensor assembly 220 omitting certain components for clarity. FIG. 7 provides a bottom-viewing-upward perspective view of an embodiment of the sensor assembly 220 omitting certain components for clarity. FIG. 8 provides a top-viewing-downward perspective view of an embodiment of the sensor assembly 220 omitting certain components for clarity.

Referring to FIGS. 3-4, a reference first direction 101 is provided and a reference second direction 102 is provided perpendicular to the first direction 101. Embodiments of the sensor assembly 220 include a body 222 forming a plenum 230, a first wire path 232, a second wire path 234, and a sensor cavity 236. The body 222 forms the first wire path 232 and the second wire path 234 each extending from the plenum 230 to the sensor cavity 236. In a particular embodiment, the first wire path 232 and the second wire path 234 each extend substantially along the first direction 101.

Various embodiments of the body 222 include an upper wall 214 and a side wall 212 forming the plenum 230. In certain embodiments, the side wall 212 forms a substantially cylindrical volume at the plenum 230. The upper wall 214 extends across a terminal end of the side wall 212. For example, upper wall 214 extends along the second direction 102 across a terminal end of the side wall 212 along first direction 101. The upper wall 214 may accordingly form an end or cap to the plenum 230.

The first wire path 232 may particularly extend from the plenum 230 at a first end at which a first opening 218 is formed through the upper wall 214. The first wire path 232 may extend from the plenum 230 at the first end to the sensor cavity 236 at a second end distal to the first end. The second wire path 234 may particularly extend from the plenum 230 at a first end at which a second opening 219 is formed through the upper wall 214. The second wire path 234 may extend from the plenum 230 at the first end to the sensor cavity 236 at a second end distal to the first end. In still particular embodiments, the first opening 218 and the second opening 219 each form discrete openings through the upper wall 214, such as depicted more clearly in the perspective view in FIG. 7. The first wire path 232 and the second wire path 234 may each particularly form discrete pathways extending from respective openings 218, 219 formed through the upper wall 214 of the body 222.

In particular embodiments, such as depicted in FIGS. 4-6, the body 222 forms a neck 216 extending from the upper wall 214. In certain embodiments, the neck 216 extends along the first direction 101 from the upper wall 214. The first wire path 232 and the second wire path 234 may each particularly form discrete pathways extending from respective openings 218, 219 formed through the upper wall 214 and through the neck 216. In a still particular embodiment, the first wire path 232 and the second wire path 234 may each particularly form discrete pathways extending through the neck 216 substantially along the first direction 101 from respective openings 218, 219 formed through the upper wall 214.

Referring to FIGS. 4-6, the body 222 includes a centerbody 224 forming a fluid path 226 extending in fluid communication between the plenum 230 to each of the first wire path 232 and the second wire path 234. The centerbody 224 extends within the neck 216. In particular embodiments, the centerbody 224 extends substantially co-directional to the neck 216 (e.g., along first direction 101). In a still particular embodiment, the first wire path 232 and the second wire path 234 are each formed between the centerbody 224 and the neck 216. For example, the first wire path 232 and the second wire path 234 are each formed between the centerbody 224 and the neck 216 along the second direction 102.

The upper wall 214 forms an opening, such as a third opening 217, from which the fluid path 226 is extended from the plenum 230. The first opening 218, the second opening 219, and the third opening 217 each form discrete openings through the upper wall 214 from which respective paths 232, 234, 226 are extended. At or proximate to the second end of the fluid path 226 distal to the first end (i.e., the first end from which the fluid path 226 is extended from the plenum 230), the body 222 forms a first exit opening 227 providing fluid communication between the fluid path 226 and the first wire path 232. At or proximate to a second end 247 of the fluid path 226 distal to the first end 225, the body 222 forms a second exit opening 228 providing fluid communication between the fluid path 226 and the second wire path 234.

In various embodiments, the body 222 forms a top wall 237 separating the sensor cavity 236 from the fluid path 226. In particular embodiments, the top wall 237 extends along the second direction 102. The top wall 237 may form an end or cap at the second end of the fluid path 226. The body 222 may form the exit openings 227, 228 as discrete openings between the top wall 237 and the centerbody 224.

The sensor assembly 220 includes a sensor 240 positioned at the sensor cavity 236. The top wall 237 may form a top wall surface 229 at which the sensor 240 is positioned. In a particular embodiment, the sensor 240 may include a cushion or barrier material 246. The barrier material 246 is positioned at the top wall surface 229, such as to separate the sensor 240 from the top wall 237. The barrier material 246 may provide a flexible surface allowing the sensor 240 to be pushed down onto during assembly. In various embodiments, the barrier material 246 includes a natural rubber, a synthetic rubber, or other similar or comparable material. In still various embodiments, the barrier material 246 includes any appropriate thermal insulating material.

The body 222 forms a top surface 215 at which a cap 250 is positioned. In a particular embodiment, the top surface 215 is positioned at the neck 216 at which the cap 250 is positioned. The body 222 forms a sensor opening 213 though the top surface 215. The sensor opening 213 provides access and opening (e.g., along the first direction 101) to the sensor cavity 236. The sensor opening 213 allows the sensor 240 to be positioned into the sensor cavity 236.

During assembly wires 242, 244 may be welded onto sensor 240. The sensor 240 and wires 242, 244 assembly may be positioned through sensor opening 213 and into respective cavities and paths such as described herein. Cap 250 is positioned over the top surface 215 of the body 222, or particularly over neck 216. When cap 250 is positioned accordingly, sensor 240 may be pushed downward into the barrier material 246. The flexible barrier material 246 may allow the sensor 240 to seat securely into the sensor cavity 236 while avoiding damage during assembly.

Referring back to FIGS. 4-5, in a particular embodiment, centerbody 224 is extended into the plenum 230. For instance, centerbody 224 is extended along first direction 101 into plenum 230. Stated differently, a first end 225 of the centerbody 224 is extended into the plenum 230 and upper wall 214 is above the first end 225 along the first direction 101. As depicted in FIG. 5, first wire 242 is inserted through first wire path 232 (e.g., through first opening 218) and second wire 244 is inserted through second wire path 234 (e.g., through second opening 219). Potting material 252 may be applied at the upper wall 214 in the plenum 230 to retain the wires 242, 244 in place. In a particular embodiment, centerbody 224 is extended into the plenum 230 for a distance (e.g., along first direction 101) greater than a thickness of the potting material 252. The centerbody 224 may accordingly mitigate potting material 252 from entering or blocking the fluid path 226.

In various embodiments, the cap 250 is formed of any appropriate material for a thermocouple or thermistor sensor (e.g., sensor 240). In particular embodiments, the cap 250 includes aluminum, or an aluminum alloy, or other appropriate conducting material, such as to conduct heat from the heating assembly 122 or cookware to the sensor 240.

Various embodiments of the sensor 240 may include any appropriate device for detecting temperature at a cooktop appliance. In a particular embodiment, sensor 240 is a negative temperature coefficient (NTC) thermistor that is configured to use resistance properties of one or more materials to determine temperature. However, it should be appreciated that any appropriate temperature sensing device may be utilized.

Various embodiments of the wires 242, 244 may include a covering, jacket, sheath 243 or other material, such as an insulation material, covering a conductive wire element. The insulation material may include, but is not limited to, a fiberglass insulation material, a thermoplastic, a thermoset, or other appropriate material.

In still various embodiments, body 222 is formed of a plastic material suitable for cooktop heat, thermal cycling, and fluid contact.

In still yet various embodiments, the sensor assembly 220 may form a spring-loaded assembly including a spring 260 (FIGS. 5A-5B) positioned to load against the body 222 (e.g., along first direction 101). A housing 270 may surround the spring 260 and body 222.

In a particular embodiment, upper wall 214 forms a single opening (i.e., one of first opening 218, second opening 219, or third opening 217) providing fluid communication between plenum 230 and each of paths 232, 234, 226. In such an embodiment, the wire path may be exposed (i.e., without potting material 252). Fluid is allowed to exchange between plenum 230 through the unsealed wire path.

Figure 9:
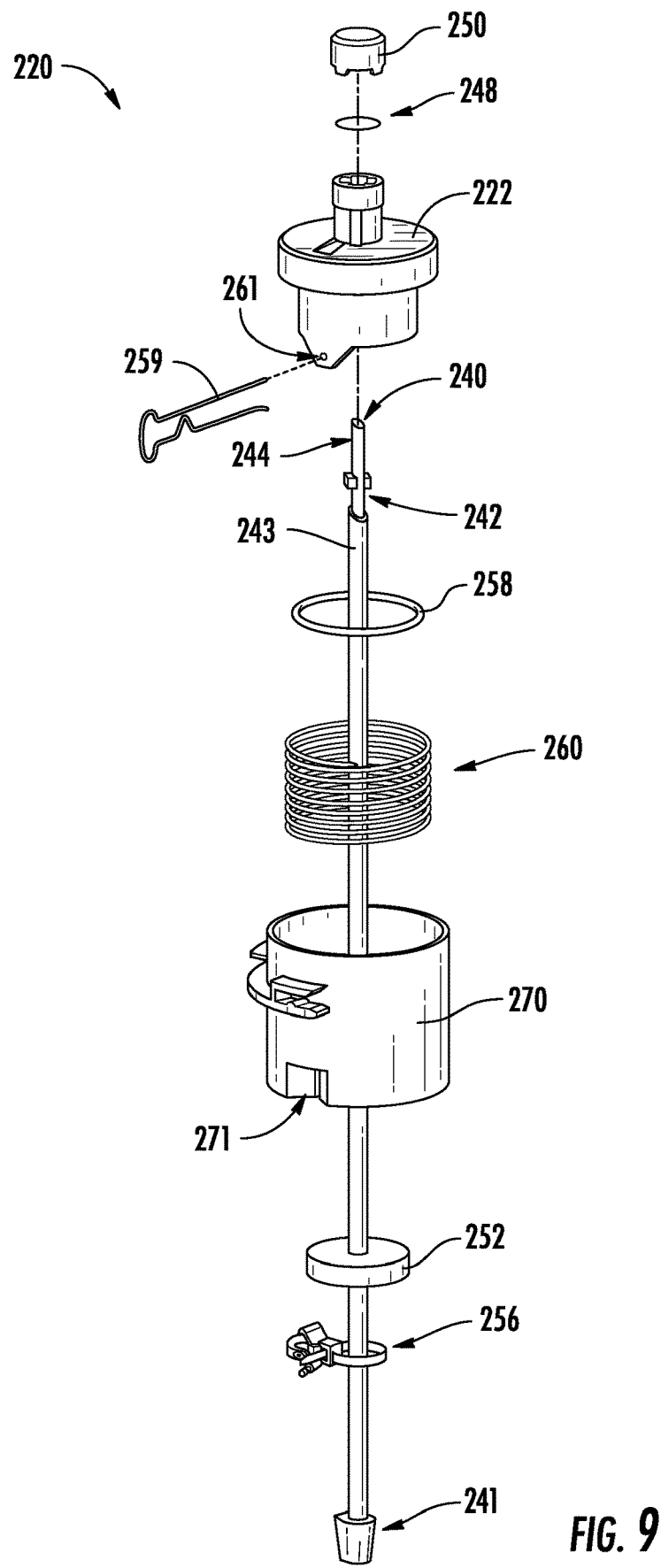
FIG. 9 provides an exploded view of an exemplary embodiment of the temperature sensor assembly in accordance with an exemplary embodiment of the present subject matter.

In another particular embodiment, upper wall 214 forms a single opening (i.e., one or first opening 218 or second opening 219) providing fluid communication between plenum 230 and wire paths 232, 234, and a single opening 217 providing fluid communication between plenum 230 and fluid path 226. In a particular embodiment, the single opening allows the wires 242, 244 to extend through a single wire path (i.e., one of first wire path 232 or second wire path 234). For instance, upper wall 214 forms a single wire path providing fluid communication from plenum 230 to sensor cavity 236. The single wire path allows wires 242, 244 to egress therethrough between sensor cavity 236 and plenum 230. In an embodiment, wires 242, 244 are bound together via sheath 243 (FIG. 9). Accordingly, a single wire path may be configured to allow sheath 243, including wires 242, 244, to extend from plenum 230 to sensor cavity 236.

In yet another embodiment, upper wall 214 forms the first opening 218 and the second opening 219. One or both of wire paths 232, 234 may be exposed (i.e., without potting material 252). Fluid is allowed to exchange between plenum 230 through one or both unsealed wire paths 232, 234.

In still another embodiment, upper wall 214 forms a plurality of third openings 217 providing fluid communication from the plenum 230 to a plurality of fluid paths 226. In a still particular embodiment, each respective fluid path 226 is in fluid communication with a respective exit opening 227, 228. In such an embodiment, a first fluid path extends from a first discrete third opening through the upper wall to the first exit opening 227 and a second fluid path extends from a second discrete third opening through the upper wall to the second exit opening 228.

An exemplary embodiment of a method for constructing a temperature sensor assembly such as provided herein includes routing the wires 242, 244 through respective wire paths 232, 234. Wires 242, 244 are operably coupled to sensor 240 using any appropriate joining method. Wires 242, 244 are fixed in position at the body 222 by applying an adhesive potting material 252, such as, but not limited to, a silicone or silicone-based adhesive, to the wires 242, 244 and the body 222 at plenum 230. In particular embodiments, potting material 252 is applied to the wires 242, 244 and the body 222 at the openings 218, 219. Accordingly, paths 232, 234 may be sealed from fluid communication to plenum 230. The cap 250 is positioned and secured to the neck 216 using an appropriate adhesive and sealant, such as, but not limited to, a silicone or silicone-based adhesive sealant, such as, but not limited to, room-temperature-vulcanized (RTV) silicone. In particular embodiments, adhesive sealant is applied in a cavity 254 between an outer surface of the neck 216 and an inner surface of the cap 250. In a still particular embodiment, adhesive sealant is applied across the entire cavity 254 between the inner surface of cap 250 and outer surface of neck 216.

Referring to FIG. 9, an exploded view of an exemplary embodiment of the sensor assembly 220 is provided. The sensor assembly 220 provided in FIG. 9 may be configured substantially similarly as depicted and described in various embodiments in regard to FIGS. 3-8. The sensor 240 may additionally include a substrate 248 configured to contact the cap 250 surrounding the sensor 240 and the sensor cavity 236. The sensor opening 213 may further allow the substrate 248 to contact the cap 250 when the cap 250 is placed onto the top surface 215 (e.g., see FIGS. 5A-5B).

Body 222 may form a clip opening 261 through which a fastener, pin, or clip 259 is insertable. Clip 259 may retain body 222 in a fixed position relative to housing 270. Housing 270 may form a slot 271 extending along the first direction 101. A seal 258, such as an O-ring, gasket, rope seal, or other appropriate sealing material, may be positioned between spring 260 and body 222. Spring 260 may be positioned to react against housing 270, such as to bias body 222 in an upward direction (i.e., along first direction 101 in FIGS. 3-4). Spring 260 may protrude neck 216 through ceramic plate 110 (FIG. 1B).

In still particular embodiments, a clamp or wrap 256 may join wires 242, 244 together or position the wire bundle, bound by sheath 243, in any desired position. Wires 242, 244 may further include connector 241 positioned at an end of wires 242, 244 distal to sensor 240.

Referring to FIGS. 10-11, perspective views of exemplary embodiments of the sensor assembly 220 are provided. The sensor assembly 220 provided in FIGS. 10-11 may be configured substantially similarly as depicted and described in various embodiments in regard to FIGS. 3-9. The sensor assembly 220 may further include a housing cap 280. Housing cap 280 is configured to position around housing 270. Housing cap 280 includes a central opening 282 configured to allow cap 250 to extend through housing cap 280. Housing cap 280 may mitigate exposure or fluid flow between body 222 and housing 270.

Figure 12:
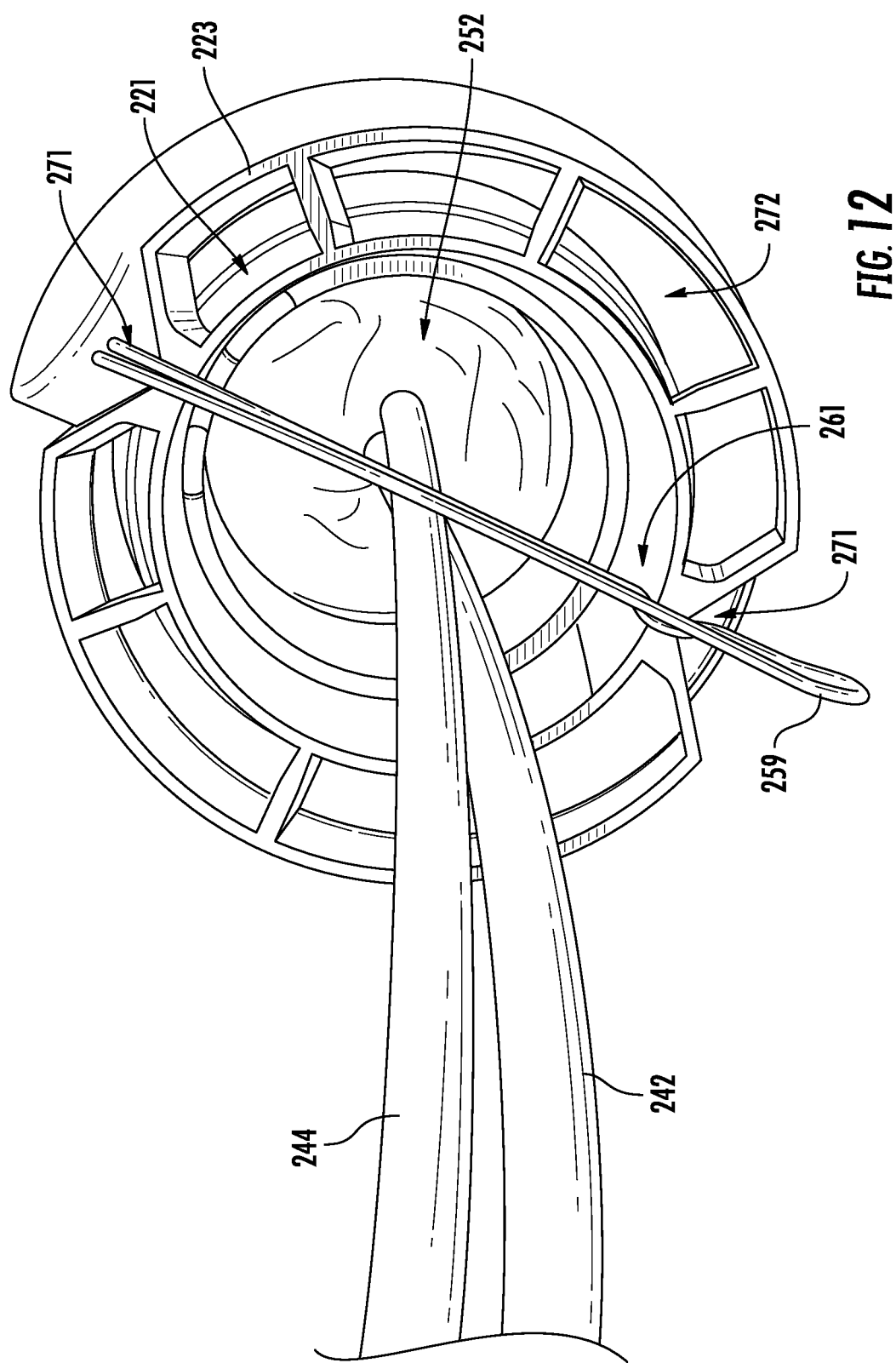
FIG. 12 provides a perspective view of an exemplary embodiment of the temperature sensor assembly in accordance with an exemplary embodiment of the present subject matter.

Referring to FIG. 12, a perspective view of an exemplary embodiment of the sensor assembly 220 is provided. Sensor assembly 220 provided in FIG. 12 may be configured substantially similarly as depicted and described in various embodiments in regard to FIGS. 3-11. The sensor assembly 220 may further form a flowpath 272 between an outer wall 223 an inner wall 221 of housing 270. Flowpath 272 may allow for bulk flow of fluids around an outside of housing 270, such as water or other fluids as may be spilled from cooking or cleaning.

FIG. 12 further depicts an exemplary embodiment of clip 259 extending through slot 271 at housing 270 and opening 261 at body 222. Clip 259 may retain a position of body 222 relative to housing 270, such as to limit relative rotation. Slot 271 may furthermore limit movement of body 222 along the first direction 101 (FIGS. 3-4). Such limited movement may be particularly beneficial for movement, shipping, or packaging of the sensor assembly 220. It should be appreciated that clip 259 may be removed, such as when sensor assembly 220 is installed at cooktop appliance 100.

Referring to various embodiments of the cooktop appliance 100 and sensor assembly 220 provided in FIGS. 1-12, during an exemplary operation of the sensor assembly 220, when the sensor 240 is heated (e.g., via heat conducted from heating assembly 122 or cookware), air in the sensor cavity 236 will expand and bias toward escaping the cap 250. The fluid path 226, exit openings 227, 228, and portions of the wire paths 232, 234 may together form a breathing path that allows for the heated air at the sensor cavity 236 to escape to plenum 230, such as depicted schematically via arrows 262 in FIG. 5A. The breathing path provides a path of lesser resistance in contrast to potential holes, gaps, opening, inconsistencies, or defects in the adhesive sealant applied at cavity 254.

During an exemplary operation of the sensor assembly 220, when sensor 240 is cooled, air in the sensor cavity 236 may contract and draw more air into the sensor cavity 236, such as depicted schematically via arrows 262 in FIG. 5B. The breathing path formed between the sensor cavity 236 and the plenum 230 prevents spilled fluids from reaching the sensor 240, such as in contrast to fluids (e.g., liquid foods, such as water, soup, sauces, gravies, etc. or airborne food particles, grease, etc.) that may be sucked into a cavity between a cap and neck (e.g., cavity 254) without a breathing path.

Embodiments of the sensor assembly provided herein may mitigate sensor failure related to food spillage by providing a breathing path at an interior of the sensor assembly that is substantially fluidly segregated from foods, spillage, fluids, etc. outside of the sensor assembly (e.g., outside of body 222). Such mitigation may improve reliability and longevity of the associated sensor. The breathing path such as described herein may allow for less manufacturing inspection of sensor assemblies, such as to allow or tolerate gaps, cavities, holes, openings, defects, or inconsistencies in the application of adhesive sealant at a volume between the cap and the neck. Such increased tolerance may desirably lower the cost of manufacturing. Embodiments provided herein may provide desired sealing and fluid segregation without the use of gaskets or seals (e.g., O-Rings, thread seal tape, PTFE tape, etc.), threads, or other structures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
   a ceramic plate;
   a heating element positioned below the ceramic plate;
   a temperature sensor assembly positioned at least partially through the ceramic plate, the temperature sensor assembly comprising:
      a body forming a plenum, a first wire path, a second wire path, and a sensor cavity, wherein the body forms the first wire path and the second wire path each extending from the plenum from a first end to the sensor cavity at a second end distal to the first end, and wherein the body comprises a centerbody, the centerbody forming a fluid path extending in fluid communication from the plenum to each of the first wire path and the second wire path, wherein the body forms a top wall separating the sensor cavity from the fluid path;
      a sensor positioned at the sensor cavity;
      a first wire extending through the first wire path; and
      a second wire extending through the second wire path, wherein the first wire and the second wire each operably couple to the sensor at the sensor cavity.

2. The cooktop appliance of claim 1, the body comprising an upper wall and a side wall together forming the plenum.

3. The cooktop appliance of claim 2, wherein a first opening is formed through the upper wall, wherein the first wire path extends from the first opening.

4. The cooktop appliance of claim 3, wherein a second opening is formed through the upper wall, wherein the second wire path extends from the second opening.

5. The cooktop appliance of claim 4, wherein the upper wall forms a third opening, wherein the fluid path extends from the third opening.

6. The cooktop appliance of claim 5, wherein the upper wall forms the first opening, the second opening, and the third opening as discrete openings through the upper wall.

7. The cooktop appliance of claim 1, wherein the body forms a first exit opening providing fluid communication between the fluid path and the first wire path.

8. The cooktop appliance of claim 7, wherein the body forms a second exit opening providing fluid communication between the fluid path and the second wire path.

9. The cooktop appliance of claim 1, wherein the centerbody extends through an upper wall into the plenum.

10. The cooktop appliance of claim 1, the body comprising a neck extending co-directional to the centerbody.

11. The cooktop appliance of claim 10, wherein the first wire path and the second wire path are each formed between the centerbody and the neck.

12. The cooktop appliance of claim 1, wherein the first wire path and the second wire path are each discrete pathways extending from a respective opening formed through an upper wall of the body.

13. A sensor assembly, the sensor assembly comprising:
   a body forming a plenum, a first wire path, a second wire path, and a sensor cavity, wherein the body forms the first wire path and the second wire path each extending from the plenum from a first end to the sensor cavity at a second end distal to the first end;
   a centerbody forming a fluid path extending in fluid communication from the plenum to each of the first wire path and the second wire path, wherein the body forms a top wall separating the sensor cavity from the fluid path;
   a sensor positioned at the sensor cavity;
   a first wire extending through the first wire path; and
   a second wire extending through the second wire path, wherein the first wire and the second wire each operably couple to the sensor at the sensor cavity.

14. The sensor assembly of claim 13, the body comprising an upper wall at least in part forming the plenum, the upper wall forming an opening extended therethrough, wherein the first wire path and the second wire path each extend in fluid communication from the plenum through the opening.

15. The sensor assembly of claim 14, wherein the fluid path extends in fluid communication from the plenum through the opening.

16. The sensor assembly of claim 13, wherein the body forms a first exit opening providing fluid communication between the fluid path and the first wire path.

17. The sensor assembly of claim 16, wherein the body forms a second exit opening providing fluid communication between the fluid path and the second wire path.

18. The sensor assembly of claim 13, the body comprising an upper wall at least in part forming the plenum, wherein the centerbody extends through the upper wall into the plenum.

19. The sensor assembly of claim 13, wherein the body comprises a neck extending co-directional to the centerbody, the sensor assembly comprising:
   a housing surrounding the body; and
   a spring configured to react against the housing to bias the neck through an opening at the ceramic plate.

20. The sensor assembly of claim 19, wherein the first wire path and the second wire path are each formed between the centerbody and the neck.

* * * * *